(12) United States Patent
Kim

(10) Patent No.: US 9,873,929 B2
(45) Date of Patent: Jan. 23, 2018

(54) METHOD OF MANUFACTURING TAILOR WELDED BLANKS

(71) Applicant: HYUNDAI MOTOR COMPANY, Seoul (KR)

(72) Inventor: So Youn Kim, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 310 days.

(21) Appl. No.: 14/660,199

(22) Filed: Mar. 17, 2015

(65) Prior Publication Data

US 2016/0144456 A1    May 26, 2016

(30) Foreign Application Priority Data

Nov. 21, 2014   (KR) ........................ 10-2014-0163758

(51) Int. Cl.

| | |
|---|---|
| *B23K 26/21* | (2014.01) |
| *B23K 26/322* | (2014.01) |
| *C22C 38/04* | (2006.01) |
| *C21D 6/00* | (2006.01) |
| *C21D 9/50* | (2006.01) |
| *C21D 9/52* | (2006.01) |
| *C21D 10/00* | (2006.01) |
| *C22C 38/08* | (2006.01) |
| *B23K 101/18* | (2006.01) |
| *B23K 103/08* | (2006.01) |

(52) U.S. Cl.
CPC ............. *C22C 38/04* (2013.01); *B23K 26/21* (2015.10); *B23K 26/322* (2013.01); *C21D 6/001* (2013.01); *C21D 6/005* (2013.01); *C21D 9/505* (2013.01); *C21D 9/525* (2013.01); *C21D 10/00* (2013.01); *C22C 38/08* (2013.01); *B23K 2201/185* (2013.01); *B23K 2203/08* (2013.01)

(58) Field of Classification Search
CPC .............................. B23K 26/21; B23K 26/322
USPC .......................................................... 148/525
See application file for complete search history.

(56) References Cited

U.S. PATENT DOCUMENTS

| | | | |
|---|---|---|---|
| 2013/0236239 A1 | 9/2013 | Brandt et al. | |
| 2014/0154521 A1* | 6/2014 | Kwon | ................... B23K 26/24 428/577 |

FOREIGN PATENT DOCUMENTS

| | | | |
|---|---|---|---|
| EP | 1878531 B1 | | 8/2010 |
| JP | 2003145286 A | * | 5/2003 |
| JP | 2008-055479 A | | 3/2008 |
| JP | 2013-533807 A | | 8/2013 |
| JP | 2013-220445 A | | 10/2013 |
| KR | 10-2009-0005004 A | | 1/2009 |

(Continued)

OTHER PUBLICATIONS

English language machine translation of JP 2003145286 A to Takeda.*

(Continued)

*Primary Examiner* — Brian Walck
(74) *Attorney, Agent, or Firm* — McDermott Will & Emery LLP

(57) ABSTRACT

A method of manufacturing tailor welded blanks may be capable of improving a quality of a welded portion and shortening a manufacturing time when a tailor welded blank is manufactured using a coated steel plate. The method of manufacturing tailor welded blanks includes welding one or more pairs of different coated steel plates having different thicknesses or strengths with laser using a filler wire.

4 Claims, 3 Drawing Sheets

(56) References Cited

FOREIGN PATENT DOCUMENTS

| KR | 10-1035753 B1 | 5/2011 |
|---|---|---|
| KR | 10-2013-0102461 A | 9/2013 |
| KR | 10-2014-0071581 A | 6/2014 |
| WO | 2014-075824 A1 | 5/2014 |

OTHER PUBLICATIONS

Notice of Allowance Korean Patent Application No. 10-2014-0163758 dated Jan. 31, 2017.
Korean Office Action issued in Korean Application No. 10-2014-0163758 dated Dec. 1, 2015.

* cited by examiner

METHOD OF MANUFACTURING TAILOR WELDED BLANKS

CROSS-REFERENCE(S) TO RELATED APPLICATIONS

The present application claims priority under 35 U.S.C. §119 to Korean Patent Application Number 10-2014-0163758 filed on Nov. 21, 2014, with the Korean Intellectual Property, the disclosure of which is incorporated herein by reference.

BACKGROUND OF THE INVENTION

Field of the Invention

Exemplary embodiments of the present invention relate to a method of manufacturing tailor welded blanks manufactured by interconnecting steel plates having different thicknesses and materials, and more particularly, to a method of manufacturing tailor welded blanks, capable of improving a quality of a welded portion and shortening a manufacturing time when a tailor welded blank is manufactured using a coated steel plate.

Description of Related Art

In recent years, requirements to vehicles for reinforcement of environments and safety regulations have been continually strengthened. That is, in order to correspond to a lightening demand for improvement in fuel efficiency and enhancement of collision safety, high strength steel including AHSS (Advance High Strength Steel), for example, tends to be widely applied to vehicles.

High strength parts are applied during manufacturing of a vehicle body to cope with a side collision. Particularly, the role of side pillars is very important for protection of a battery during a side collision in an electric vehicle, compared to that of the vehicle body in an existing internal combustion engine. To this end, super high strength steel by an HPF (Hot Press Forming) technique is increasingly used.

Meanwhile, collision absorption parts may be largely classified into two parts.

One is an energy absorption part which absorbs impacts applied from the outside through deformation thereof.

The energy absorption part is representatively applied to each of the front of a front side member, the rear of a rear side member, and the bottom of a B-pillar.

The other is an anti-intrusion part which is not nearly deformed. For example, since a cabin zone occupied by occupants should be secured during a collision, the collision absorption part applied to the cabin zone is mostly the anti-intrusion part.

The anti-intrusion part is representatively applied to each of the rear of the front side member, the front of the rear side member, and the top of the B-pillar.

The use of the anti-intrusion part to which the HPF technique is applied is rapidly increased to improve collision safety. The AHHS having a relatively high strain rate is applied to the energy absorption part.

The combined form of the energy absorption part and the anti-intrusion part is used in each of the front side member, the rear side member, and the B-pillar, and is manufactured by welding and forming the two parts.

In this case, a mainly used TWB (Tailor Welded Blank) method includes a series of processes of manufacturing parts by cutting steel plates having different thicknesses, strengths, and materials to a required shape as if cutting out a suit, welding and the cut steel plates, and then forming the welded steel plates with a press. The TWB method is largely configured of a cutting process of cutting steel plates, a welding process of welding the cut steel plates with laser, and a blanking process of integrally machining the welded steel plates.

Since different steel plates having different thicknesses and materials are welded by the TWB method, the welded part may have characteristics required for each portion. In addition, the different steel plates may be manufactured to have an accurate dimension as well as a strong structure and a long life by the TWB method, compared to a single steel plate. Therefore, the TWB method is applied during production of structures such as body panels of vehicles or electric rail vehicles.

Particularly, the TWB method may achieve reduction of the number of parts, vehicle body lightening, manufacturing cost reduction, quality improvement, collision safety improvement, vehicle body structure simplification, and the like, compared to a conventional forming method of manufacturing parts by cutting steel plates, forming each of the cut steel plates, and then spot-welding the formed steel plate during production of structures such as vehicle body panels, in vehicle industrial fields requiring high productivity, low cost, and low weight.

However, in a coated steel plate having an Al—Si or Zn coated layer, it is difficult to secure an austenite structure even when the coated steel plate is heated at a temperature of 900 to 950° C. and it is difficult to secure a martensite structure ever when the coated steel plate is quenched, since the coated layer is mixed into a welded portion during laser welding. For this reason, there is a problem in that material properties of the welded portion are deteriorated.

Accordingly, it is necessary to remove the coated layer from the coated steel plate in order to weld the coated steel plate. However, there is a problem in that a quality of the production part is deteriorated since rust is generated at a removed portion of the coated layer for welding.

SUMMARY OF THE INVENTION

An embodiment of the present invention is directed to a method of manufacturing tailor welded blanks, capable of improving a quality of a welded portion even though a coated layer is not removed when a coated steel plate is welded by tailor welded blank welding.

Another embodiment of the present invention is directed to a method of manufacturing tailor welded blanks in which a welded portion has a full martensite structure after hot stamping work.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method of manufacturing tailor welded blanks includes welding one or more pairs of different coated steel plates having different thicknesses or strengths with laser using a filler wire.

The filler wire may comprise an ingredient through which a welded portion is transformed to have an austenite structure at a temperature of 900 to 950° C. even though a coated layer of each of the coated steel plates is mixed into the welded portion.

The filler wire may contain C and Mn as austenite stabilization elements.

The filler wire may further contain Ni as an austenite stabilization element.

The filler wire may comprise 0.6 to 0.9 wt % of C, 0.3 to 0.9 wt % of Mn, 1.6 to 3.0 wt % of Ni, and the balance of Fe, and other inevitable impurities.

Each of the coated steel plate may include an Al—Si coated layer, and a basic material may comprise 0.19 to 0.25 wt % of C, 0.20 to 0.40 wt % of Si, 1.10 to 1.60 wt % of Mn, 0.03 wt % or less of P, 0.015 wt % or less of S, 0.10 to 0.60 wt % of Cr, 0.0008 to 0.0050 wt % of B, the balance of Fe, and other inevitable impurities.

The method may further includes forming a laser-welded tailor welded blank by hot stamping using the filler wire and then quenching the same at a quenching rate of 40° C./s or more, so as to transform a welded portion structure into a martensite structure.

BRIEF DESCRIPTION OF THE DRAWINGS

The features and advantages of the present invention will be more clearly understood from the following detailed description taken in conjunction with the accompanying drawing, in which.

DESCRIPTION OF SPECIFIC EMBODIMENTS

Figure 1:
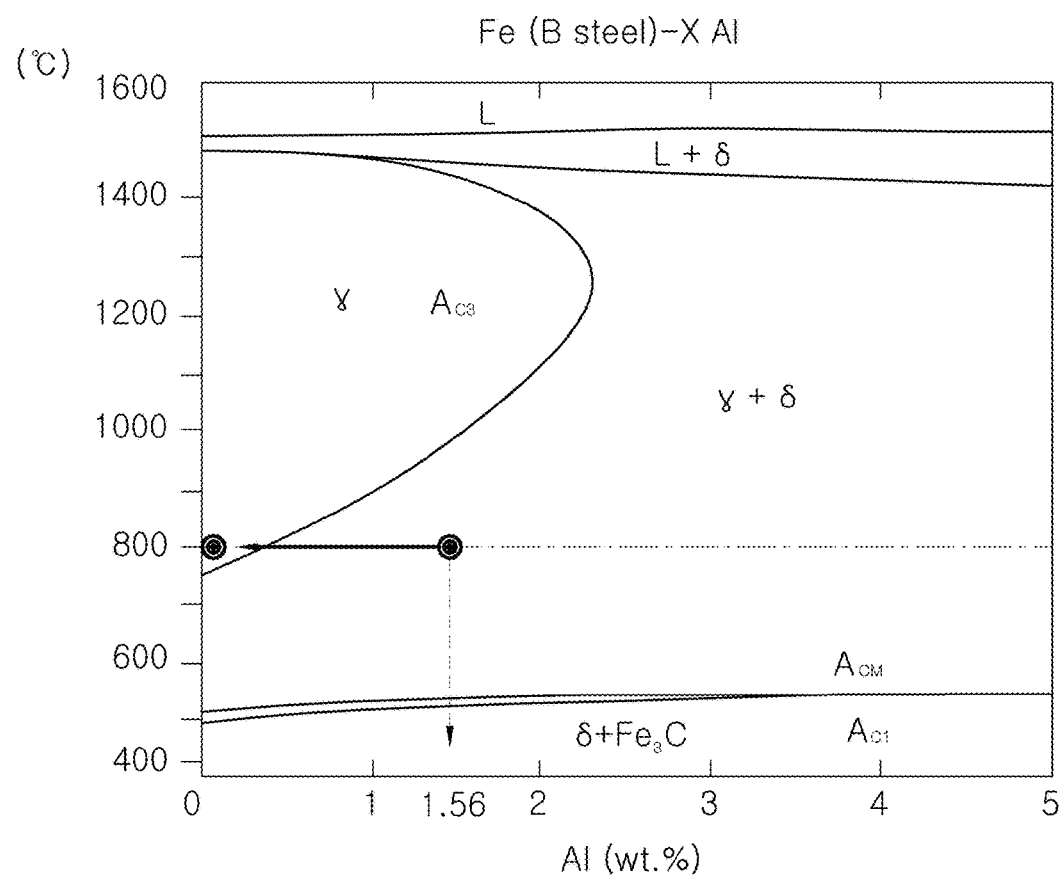
FIG. 1 is a graph illustrating a transformation curve according to an aluminum content and temperature in the related art.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

An main idea of a method of manufacturing tailor welded blanks according to an embodiment of the present invention is to prevent problems such as strength deterioration caused due to mixing of an ingredient of a coated layer into a welded portion when a tailor welded blank having locally different material properties is manufactured by interconnecting one or more pairs of different coated steel plates having different materials or thicknesses with laser welding.

In general, when the coated steel plates are bonded with the laser welding in a state in which the coated layer of the welded portion is not removed, problems such as strength deterioration of the welded portion are caused when the coated layer is melted and mixed into the welded portion. This is because the welded portion exhibits a different material property from a basic material since the welded portion has a mixed ingredient of the basic material of the coated steel plate and the coated layer. For this reason, the strength deterioration of the welded portion is caused.

A boron steel plate having hardenability is mainly used as a basic material of the tailor welded blank for hot stamping forming, and an Al—Si coated layer is mainly used as the coated layer.

FIG. 1 is a graph illustrating a conventional transformation curve.

As shown in FIG. 1, when the coated layer is mixed into the welded portion and an Al content of the welded portion is increased, it is impossible to secure a full austenite structure even though the welded portion is heated at a temperature of 900 to 950° C. and the welded portion has a structure in which ferrite and martensite coexist with each other, instead of having a full martensite structure, even though the welded portion is quenched after hot stamping forming. For this reason, the strength deterioration of the welded portion is caused.

In the tailor welded blank used in the present invention, a basic material including 0.19 to 0.25 wt % of C, 0.20 to 0.40 wt % of Si, 1.10 to 1.60 wt % of Mn, 0.03 wt % or less of P, 0.015 wt % or less of S, 0.10 to 0.60 wt % of Cr, 0.0008 to 0.0050 wt % of B, the balance of Fe, and other inevitable impurities such as Cu, Mo, Ti, Nb, and the like unlike the above mentioned components are used, and an Al—Si coated layer is used.

In the method of manufacturing tailor welded blanks according to the embodiment of the present invention, it is preferable that the welded portion has a full austenite structure at a temperature of 900 to 950° C. by adjusting ingredients of the welded portion using a filler wire during laser welding.

Accordingly, the welded portion may have a desired material property by increasing strength thereof in such a manner that the welded portion is transformed to have a full martensite structure by quenching the welded portion after hot stamping forming.

Figure 2:
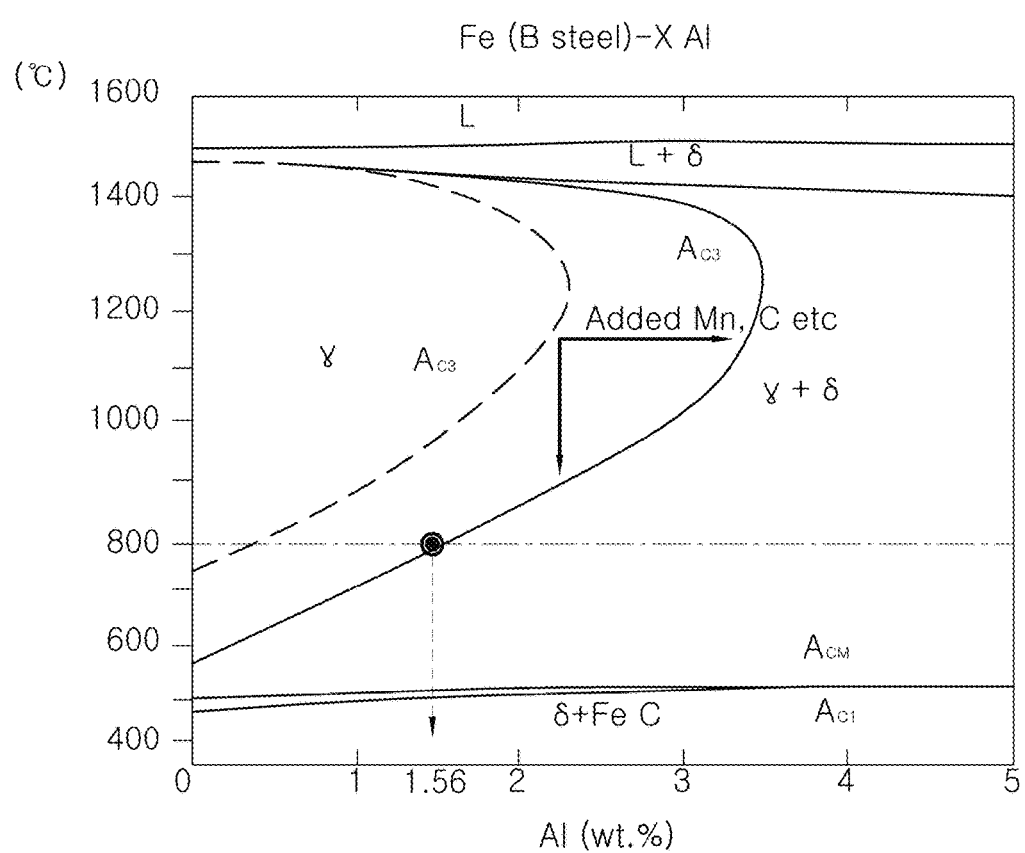
FIG. 2 is a graph illustrating movement of a transformation curve according to increase of an austenite stabilization element content.

FIG. 2 is a graph illustrating movement of a transformation curve according to increase of an austenite stabilization element content.

As shown in FIG. 2, C and Mn are austenite stabilization elements. The transformation curve is moved to the right since a eutectoid temperature $A_{C3}$ is decreased as the contents of the elements are increased, and thus an austenite region is increased.

Accordingly, the filler wire according to the embodiment of the present invention preferably contains C and Mn as the austenite stabilization elements.

Thus, the welded portion has the full austenite structure when the welded portion is heated at the temperature of 900 to 950° C. during the hot stamping forming after welding, and the welded portion is transformed to have the full martensite structure when the welded portion is quenched after the hot stamping forming.

It is preferable that the filler wire according to the embodiment of the present invention further contains Ni as the austenite stabilization element.

Figure 3:
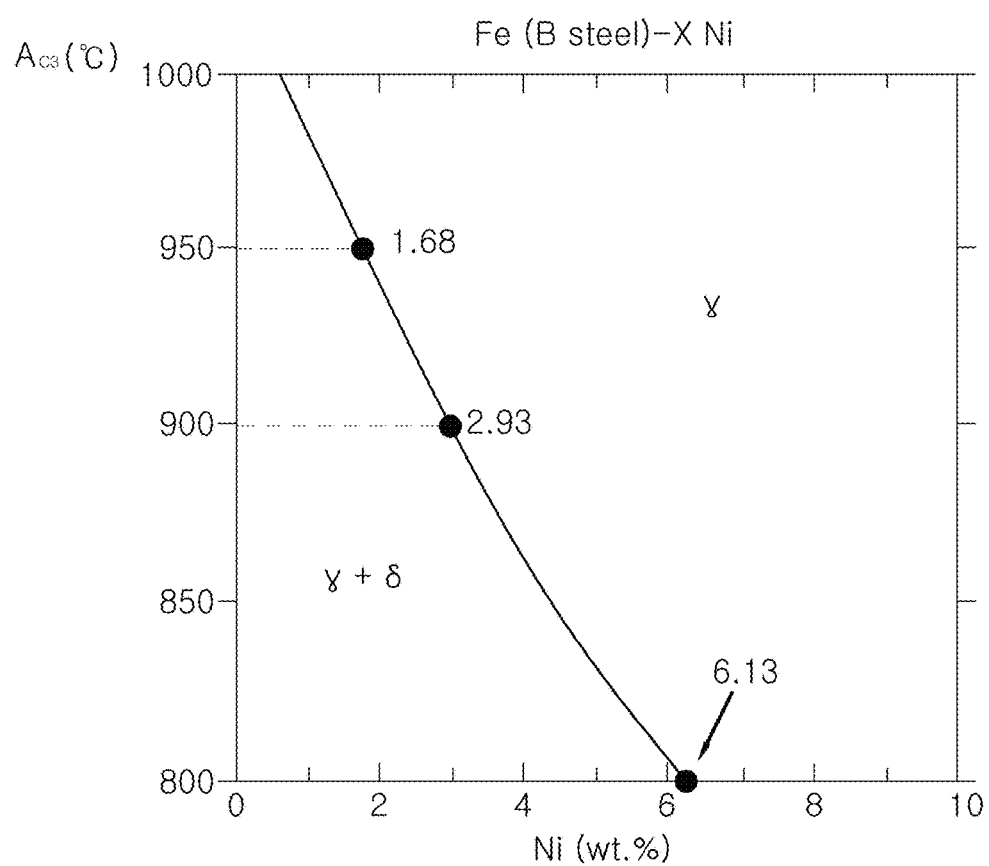
FIG. 3 is a graph illustrating a transformation curve according to increase of a nickel content; and One of ordinary skill in the art would appreciate the advantages and applications of the present application.

FIG. 3 is a graph illustrating a transformation curve according to increase of a nickel content.

As shown in FIG. 3, a eutectoid temperature $A_{C3}$ is decreased as the nickel content of the filler wire is increased.

The filler wire according to the embodiment of the present invention preferably includes 0.6 to 0.9 wt % of C, 0.3 to 0.9 wt % of Mn, 1.6 to 3.0 wt % of Ni, and the balance of Fe, and other inevitable impurities such as Cu, Mo, Ti, Nb, and the like unlike the above mentioned components.

This is because a ferrite structure coexists in the welded portion at the temperature of 900 to 950° C. during welding since an increase rate of an austenite region is low when the C content is less than 0.6 wt % and a rupture is generated at the welded portion during impact generation such as collisions since hardness and strength of the welded portion are excessively increased when the C content exceeds 0.9 wt %.

In addition, when Mn and Ni are out of the above composition range, the welded portion does not have the full austenite structure at the temperature of 900 to 950° C.

For this reason, there is a problem in that the material properties of the welded portion of the finished product are changed after the hot stamping forming and defects such as a rupture of the welded portion are generated.

A basic material rupture is generated during a tension test due to increase in strength of the welded portion when the Ni content of the filler wire is 1.6 to 3.0 wt %, whereas a welded portion rupture is generated during the tension test when the Ni content is less than 1.6 wt % or exceeds 3.0 wt %.

As shown in FIGS. 2 to 4, when the filler wire according to the embodiment of the present invention satisfies the above composition range, the welded portion has the full austenite structure at the temperature of 900 to 950° C. Consequently, it may be possible to increase the strength of the welded portion by transforming the welded portion to have the full austenite structure in such a manner that the welded portion is quenched after the hot stamping forming.

That is, the filler wire of the present invention may allow the welded portion to have the full martensite structure after the hot stamping forming by the austenite stabilization elements contained in the filler wire even though Al of the coated layer is mixed into the welded portion during welding. Thus, since the hardness and strength of the welded portion are prevented from deteriorating even though the welding is performed without the removal of the coated layer, the welded portion rupture may be prevented.

In addition, in the method of manufacturing tailor welded blanks according to the embodiment of the present invention, it is preferable that the welded portion is transformed to have the martensite structure by quenching the welded portion at a quenching rate of 40° C./s or more after the hot stamping forming.

In the present invention, it is preferable to immediately initiate quenching (within 0.5 seconds) after the hot stamping forming and to set a mean quenching rate during the quenching as 40° C./s or more.

When the quenching rate is set as 40° C./s or less, it is difficult to refine the structure of the welded portion due to grain growth. As a result, it is difficult to transform the structure of the welded portion into the full martensite structure after the quenching.

In accordance with the exemplary embodiment of the present invention, it may be possible to improve productivity and reduce manufacturing cost by shortening of a production time since coated layer removal and recoating processes are not required when a tailor welded blank is manufactured by laser welding.

In addition, since a welded portion has a full martensite structure, a quality of a welded portion may be improved.

While the present invention has been described with respect to the specific embodiments, it will be apparent to those skilled in the art that various changes and modifications may be made without departing from the spirit and scope of the invention as defined in the following claims.

What is claimed is:

1. A method of manufacturing tailor welded blanks, comprising welding one or more pairs of different coated steel plates having different thicknesses or strengths with laser using a filler wire,
    wherein each of the coated steel plate comprises a steel plate and a Al—Si coating layer, where the steel plate comprises 0.19 to 0.25 wt % of C, 0.20 to 0.40 wt % of Si, 1.10 to 1.60 wt % of Mn, 0.03 wt % or less of P, 0.015 wt % or less of S, 0.10 to 0.60 wt % of Cr, 0.0008 to 0.0050 wt % of B, Fe, and other inevitable impurities, and
    wherein the filler wire comprises 0.6 to 0.9 wt % of C, 0.3 to 0.9 wt % of Mn, 1.6 to 3.0 wt % of Ni as austenite stabilization elements through which a welded portion is transformed to have a full austenite structure at a temperature of 900 to 950° C., when a coated layer of each of the coated steel plate is mixed into the welded portion.

2. The method of claim 1, wherein the filler wire further comprises Fe and other inevitable impurities.

3. The method of claim 1, wherein each of the coated steel plate comprises an Al—Si coated layer.

4. The method of claim 1, further comprising forming a laser-welded tailor welded blank by hot stamping using the filler wire and then quenching the same at a quenching rate of 40° C./s or more, so as to transform a welded portion structure into a martensite structure.

* * * * *